US008954958B2

(12) United States Patent
Murphey et al.

(10) Patent No.: US 8,954,958 B2
(45) Date of Patent: Feb. 10, 2015

(54) METHOD OF CONFIGURING A VIRTUAL APPLICATION

(75) Inventors: C. Michael Murphey, Seattle, WA (US); Kenji C. Obata, Seattle, WA (US)

(73) Assignee: Code Systems Corporation, Seattle, WA (US)

( * ) Notice: Subject to any disclaimer, the term of this patent is extended or adjusted under 35 U.S.C. 154(b) by 1050 days.

(21) Appl. No.: 12/685,576

(22) Filed: Jan. 11, 2010

(65) Prior Publication Data

US 2011/0173607 A1 Jul. 14, 2011

(51) Int. Cl.
*G06F 9/455* (2006.01)
*G06F 9/44* (2006.01)
*G06F 21/53* (2013.01)

(52) U.S. Cl.
CPC .............. *G06F 8/71* (2013.01); *G06F 9/45558* (2013.01); *G06F 21/53* (2013.01); *G06F 2009/45587* (2013.01)
USPC ........................................................... 718/1

(58) Field of Classification Search
USPC ........................................................... 718/1
See application file for complete search history.

(56) References Cited

U.S. PATENT DOCUMENTS

| 4,468,732 | A | 8/1984 | Raver |
| 5,437,031 | A | 7/1995 | Kitami |
| 5,495,610 | A | 2/1996 | Shing et al. |
| 5,860,068 | A | 1/1999 | Cook |
| 5,987,590 | A | 11/1999 | Wing So |
| 6,023,712 | A | 2/2000 | Spear et al. |
| 6,263,363 | B1 | 7/2001 | Rosenblatt et al. |
| 6,453,334 | B1 | 9/2002 | Vinson et al. |
| 6,493,733 | B1 | 12/2002 | Pollack et al. |
| 6,564,229 | B1 | 5/2003 | Baweja et al. |
| 6,675,216 | B1 | 1/2004 | Quatrano et al. |
| 6,704,808 | B2 | 3/2004 | Kasamatsu et al. |
| 6,757,893 | B1 | 6/2004 | Haikin |
| 7,028,295 | B2 | 4/2006 | Li et al. |
| 7,064,760 | B2 | 6/2006 | Capin et al. |
| 7,076,768 | B2 | 7/2006 | Li et al. |
| 7,089,259 | B1 | 8/2006 | Kouznetsov et al. |
| 7,096,253 | B2 | 8/2006 | Vinson et al. |

(Continued)

OTHER PUBLICATIONS

Chapin, "Hive: Operating System Fault Containment for Shared-Memory Multiprocessors", Technical Report No. CSL-TR-97-712, Computer Systems Laboratory, Departments of Electrical Engineering and Computer Science, Stanford University, Jul. 1997, 156 pages.

(Continued)

*Primary Examiner* — Mohammed Rehman
*Assistant Examiner* — Xuxing Chen
(74) *Attorney, Agent, or Firm* — Heather M. Colburn; Davis Wright Tremaine LLP

(57) ABSTRACT

A method of modifying a virtual application configuration to include modifications made at runtime by a virtual application that is implemented by a first virtualized application file that was created previously using the virtual application configuration. At runtime, the virtual application implemented by the first virtualized application file stores modifications to its configuration in a sandbox memory location. The method includes reading the modifications from the sandbox memory location. Then, the modifications are written to the virtual application configuration. The modified virtual application configuration is then used to create a second virtualized application file that includes the modifications stored in the sandbox memory location.

21 Claims, 5 Drawing Sheets

(56) References Cited

U.S. PATENT DOCUMENTS

| | | |
|---|---|---|
| 7,096,416 B1 | 8/2006 | Smith et al. |
| 7,117,495 B2 | 10/2006 | Blaser et al. |
| 7,130,073 B2 | 10/2006 | Kumar et al. |
| 7,162,036 B2 | 1/2007 | Rowe |
| 7,240,162 B2 | 7/2007 | de Vries |
| 7,246,351 B2 | 7/2007 | Bloch et al. |
| 7,272,613 B2 | 9/2007 | Sim et al. |
| 7,337,298 B2 | 2/2008 | Kawachiya et al. |
| 7,356,679 B1 | 4/2008 | Le et al. |
| 7,360,097 B2 | 4/2008 | Rothstein |
| 7,386,542 B2 | 6/2008 | Maybury et al. |
| 7,437,371 B2 | 10/2008 | Rathakrishnan et al. |
| 7,451,196 B1 | 11/2008 | de Vries et al. |
| 7,499,991 B2 | 3/2009 | Johnson et al. |
| 7,523,116 B2 | 4/2009 | Yan |
| 7,536,541 B2 | 5/2009 | Isaacson |
| 7,577,751 B2 | 8/2009 | Vinson et al. |
| 7,590,644 B2 | 9/2009 | Matsakis et al. |
| 7,600,097 B1 | 10/2009 | Wright |
| 7,623,673 B2 | 11/2009 | Mercier |
| 7,634,477 B2 | 12/2009 | Hinshaw |
| 7,634,772 B2 | 12/2009 | Parthasarathy et al. |
| 7,664,367 B2 | 2/2010 | Suzuki |
| 7,669,189 B1 | 2/2010 | Umamageswaran |
| 7,689,825 B2 | 3/2010 | Iwamura |
| 7,707,564 B2 | 4/2010 | Marvin et al. |
| 7,743,407 B2 | 6/2010 | Sprigg et al. |
| 7,752,511 B2 | 7/2010 | Fulton et al. |
| 7,761,503 B2 | 7/2010 | Dhawan et al. |
| 7,797,748 B2 | 9/2010 | Zheng et al. |
| 7,801,827 B2 | 9/2010 | Bishop et al. |
| 7,831,047 B2 | 11/2010 | Rowe |
| 7,840,961 B1 | 11/2010 | Weathersby |
| 7,950,026 B1 | 5/2011 | Urbach |
| 7,970,789 B1* | 6/2011 | Blaser et al. ............ 707/783 |
| 8,010,667 B2 | 8/2011 | Zhang et al. |
| 8,065,675 B2 | 11/2011 | Strauss et al. |
| 8,069,443 B2 | 11/2011 | Ackerman et al. |
| 8,219,805 B1 | 7/2012 | Ie et al. |
| 8,230,442 B2 | 7/2012 | Aho et al. |
| 8,271,944 B2 | 9/2012 | Austin et al. |
| 8,375,140 B2 | 2/2013 | Tippin et al. |
| 8,387,006 B1 | 2/2013 | Taylor |
| 8,429,248 B1 | 4/2013 | Ketrenos et al. |
| 8,434,093 B2 | 4/2013 | Larimore et al. |
| 8,468,175 B2 | 6/2013 | Obata |
| 8,489,513 B2 | 7/2013 | Bishop et al. |
| 8,510,734 B2 | 8/2013 | Criddle et al. |
| 8,626,806 B2 | 1/2014 | Larimore et al. |
| 8,677,345 B2 | 3/2014 | Choi et al. |
| 2001/0016905 A1 | 8/2001 | Kasamatsu et al. |
| 2002/0029283 A1 | 3/2002 | Beckett et al. |
| 2002/0032754 A1 | 3/2002 | Logston et al. |
| 2002/0099951 A1 | 7/2002 | O'Connor |
| 2002/0112078 A1 | 8/2002 | Yach |
| 2002/0129129 A1 | 9/2002 | Bloch et al. |
| 2002/0133491 A1 | 9/2002 | Sim et al. |
| 2002/0161578 A1 | 10/2002 | Saidon et al. |
| 2002/0162015 A1 | 10/2002 | Tang |
| 2002/0174193 A1 | 11/2002 | Mikhalchuk |
| 2003/0031176 A1 | 2/2003 | Sim |
| 2003/0051169 A1 | 3/2003 | Sprigg et al. |
| 2004/0083474 A1 | 4/2004 | McKinlay et al. |
| 2004/0128342 A1 | 7/2004 | Maes et al. |
| 2004/0133444 A1 | 7/2004 | Defaix et al. |
| 2004/0139315 A1 | 7/2004 | Tokutani et al. |
| 2005/0132359 A1 | 6/2005 | McGuire et al. |
| 2005/0198647 A1 | 9/2005 | Hipp et al. |
| 2005/0262553 A1 | 11/2005 | Bialick et al. |
| 2005/0273772 A1 | 12/2005 | Matsakis et al. |
| 2006/0048136 A1 | 3/2006 | Vries et al. |
| 2006/0053380 A1 | 3/2006 | Spataro et al. |
| 2006/0074733 A1 | 4/2006 | Shukla et al. |
| 2006/0075064 A1 | 4/2006 | Keohane et al. |
| 2006/0123185 A1 | 6/2006 | de Vries et al. |
| 2006/0168294 A1 | 7/2006 | de Vries et al. |
| 2006/0218165 A1 | 9/2006 | Vries et al. |
| 2006/0222203 A1 | 10/2006 | Mercier |
| 2006/0230175 A1* | 10/2006 | de Vries ............ 709/231 |
| 2006/0242626 A1 | 10/2006 | Pham et al. |
| 2006/0248442 A1 | 11/2006 | Rosenstein et al. |
| 2006/0253535 A1 | 11/2006 | Betros et al. |
| 2006/0256130 A1 | 11/2006 | Gonzalez |
| 2006/0259585 A1 | 11/2006 | Keohane et al. |
| 2007/0016721 A1 | 1/2007 | Gay |
| 2007/0043943 A1 | 2/2007 | Peretti |
| 2007/0078988 A1 | 4/2007 | Miloushev et al. |
| 2007/0143704 A1 | 6/2007 | Laird-McConnell |
| 2007/0168953 A1 | 7/2007 | Diez et al. |
| 2007/0168965 A1 | 7/2007 | Zenz et al. |
| 2007/0174824 A1 | 7/2007 | Relyea et al. |
| 2007/0226798 A1 | 9/2007 | Sibert |
| 2007/0234277 A1 | 10/2007 | Lei et al. |
| 2007/0240155 A1 | 10/2007 | Shlomai |
| 2007/0245331 A1 | 10/2007 | Daynes et al. |
| 2007/0294674 A1 | 12/2007 | Marilly et al. |
| 2008/0010389 A1 | 1/2008 | Iwata |
| 2008/0155171 A1 | 6/2008 | Jeong |
| 2008/0163194 A1 | 7/2008 | Dias et al. |
| 2008/0181230 A1 | 7/2008 | Hitt et al. |
| 2008/0184135 A1 | 7/2008 | Washburn et al. |
| 2008/0235680 A1 | 9/2008 | Strauss |
| 2008/0275938 A1 | 11/2008 | Yach |
| 2008/0281882 A1* | 11/2008 | Hachio et al. ............ 707/204 |
| 2008/0294877 A1 | 11/2008 | Haga et al. |
| 2008/0298219 A1 | 12/2008 | Yamagata et al. |
| 2008/0301672 A1 | 12/2008 | Rao et al. |
| 2009/0055542 A1 | 2/2009 | Zhao et al. |
| 2009/0064086 A1 | 3/2009 | Faus et al. |
| 2009/0076966 A1 | 3/2009 | Bishop et al. |
| 2009/0077551 A1 | 3/2009 | Whiteley |
| 2009/0110307 A1 | 4/2009 | Markowitz |
| 2009/0158432 A1 | 6/2009 | Zheng et al. |
| 2009/0193057 A1 | 7/2009 | Maes |
| 2009/0198358 A1 | 8/2009 | Logan et al. |
| 2009/0199175 A1* | 8/2009 | Keller et al. ............ 717/178 |
| 2009/0216811 A1* | 8/2009 | Manczak et al. ............ 707/201 |
| 2009/0235158 A1 | 9/2009 | Rosenstein et al. |
| 2009/0240663 A1 | 9/2009 | Plattner et al. |
| 2009/0249071 A1 | 10/2009 | De Atley et al. |
| 2009/0249324 A1* | 10/2009 | Brar et al. ............ 717/173 |
| 2009/0300076 A1 | 12/2009 | Friedman et al. |
| 2009/0300151 A1 | 12/2009 | Friedman et al. |
| 2009/0307351 A1 | 12/2009 | Raja et al. |
| 2009/0307763 A1 | 12/2009 | Rawlins et al. |
| 2009/0313322 A1 | 12/2009 | Sheehan et al. |
| 2009/0328030 A1 | 12/2009 | Fries |
| 2010/0005291 A1 | 1/2010 | Hulten et al. |
| 2010/0023640 A1 | 1/2010 | Vinson et al. |
| 2010/0023934 A1 | 1/2010 | Sheehan et al. |
| 2010/0037206 A1 | 2/2010 | Larimore et al. |
| 2010/0037235 A1 | 2/2010 | Larimore et al. |
| 2010/0077096 A1 | 3/2010 | Philip et al. |
| 2010/0088448 A1 | 4/2010 | Min et al. |
| 2010/0106804 A1 | 4/2010 | He et al. |
| 2010/0107163 A1 | 4/2010 | Lee |
| 2010/0121973 A1 | 5/2010 | Lobacheva et al. |
| 2010/0131084 A1 | 5/2010 | Van Camp |
| 2010/0138479 A1 | 6/2010 | Zhu |
| 2010/0146590 A1 | 6/2010 | Jung |
| 2010/0205604 A1 | 8/2010 | Brower et al. |
| 2010/0241718 A1 | 9/2010 | Rasmussen et al. |
| 2010/0250782 A1 | 9/2010 | Pratt et al. |
| 2010/0281458 A1* | 11/2010 | Paladino et al. ............ 717/106 |
| 2010/0306849 A1 | 12/2010 | Zheng et al. |
| 2010/0333085 A1 | 12/2010 | Criddle et al. |
| 2011/0004840 A1 | 1/2011 | Feinberg et al. |
| 2011/0078625 A1 | 3/2011 | Mumford et al. |
| 2011/0106908 A1 | 5/2011 | Risku et al. |
| 2011/0145428 A1 | 6/2011 | Wei et al. |
| 2011/0145592 A1 | 6/2011 | Greiner |
| 2011/0145726 A1 | 6/2011 | Wei et al. |
| 2011/0153975 A1 | 6/2011 | Accapadi et al. |
| 2011/0179411 A1 | 7/2011 | Lederer |

(56) References Cited

U.S. PATENT DOCUMENTS

| | | | |
|---|---|---|---|
| 2011/0185013 A1 | 7/2011 | Obata et al. |
| 2011/0185043 A1 | 7/2011 | Zeller et al. |
| 2011/0191772 A1 | 8/2011 | Larimore et al. |
| 2011/0246659 A1 | 10/2011 | Bouazizi |
| 2011/0289513 A1 | 11/2011 | Degirmenci et al. |
| 2012/0005237 A1 | 1/2012 | Obata |
| 2012/0005244 A1 | 1/2012 | Obata et al. |
| 2012/0005246 A1 | 1/2012 | Obata |
| 2012/0005309 A1 | 1/2012 | Obata et al. |
| 2012/0005310 A1 | 1/2012 | Obata |
| 2012/0005674 A1 | 1/2012 | Larimore et al. |
| 2012/0096071 A1 | 4/2012 | Murphey et al. |
| 2012/0110337 A1 | 5/2012 | Murphey et al. |
| 2012/0203807 A1 | 8/2012 | Larimore et al. |
| 2012/0203808 A1 | 8/2012 | Larimore et al. |
| 2013/0132525 A1 | 5/2013 | Tippin |

OTHER PUBLICATIONS

Final Office Action received in U.S. Appl. No. 12/188,155, dated Aug. 31, 2012, 22 pages.
Final Office Action received in U.S. Appl. No. 12/695,107, dated Oct. 30, 2012, 16 pages.
Final Office Action received in U.S. Appl. No. 12/876,085, dated Nov. 14, 2012, 12 pages.
Final Office Action received in U.S. Appl. No. 12/879,956, dated Nov. 23, 2012, 11 pages.
Information Disclosure Statement Transmittal Letter filed herewith on May 1, 2013, 2 pages.
Non-Final Office Action received in U.S. Appl. No. 12/695,107, dated Dec. 8, 2011, 17 pages.
Non-Final Office Action received in U.S. Appl. No. 12/188,155, dated Dec. 19, 2011, 19 pages.
Non-Final Office Action received in U.S. Appl. No. 12/876,085, dated Mar. 8, 2012, 9 pages.
Non-Final Office Action received in U.S. Appl. No. 12/188,161, dated May 10, 2012, 14 pages.
Non-Final Office Action received in U.S. Appl. No. 12/879,956, dated Jun. 6, 2012, 11 pages.
Non-Final Office Action received in U.S. Appl. No. 13/171,258, dated Jul. 13, 2012, 15 pages.
Non-Final Office Action received in U.S. Appl. No. 12/876,082, dated Oct. 22, 2012, 18 pages.
Non-Final Office Action received in U.S. Appl. No. 12/916,348, dated Oct. 24, 2012, 24 pages.
Non-Final Office Action received in U.S. Appl. No. 12/906,904, dated Nov. 13, 2012, 19 pages.
Non-Final Office Action received in U.S. Appl. No. 13/449,140, dated Dec. 7, 2012, 9 pages.
Non-Final Office Action received in U.S. Appl. No. 13/088,265, dated Dec. 12, 2012, 24 pages.
Non-Final Office Action received in U.S. Appl. No. 13/449,049, dated Dec. 13, 2012, 10 pages.
Non-Final Office Action received in U.S. Appl. No. 12/188,155, dated Feb. 28, 2013, 13 pages.
Non-Final Office Action received in U.S. Appl. No. 12/876,085, dated Mar. 18, 2013, 13 pages.
Notice of Allowance received in U.S. Appl. No. 12/877,918, dated Mar. 19, 2012, 25 pages.
Notice of Allowance received in U.S. Appl. No. 12/877,918, dated Jun. 21, 2012, 31 pages.
Notice of Allowance received in U.S. Appl. No. 12/877,918, dated Aug. 16, 2012, 22 pages.
Notice of Allowance received in U.S. Appl. No. 12/877,918, dated Sep. 26, 2012, 24 pages.
Notice of Allowance received in U.S. Appl. No. 12/697,029, dated Aug. 17, 2012, 21 pages.
Notice of Allowance received in U.S. Appl. No. 12/188,161, dated Oct. 10, 2012, 13 pages.
Notice of Allowance received in U.S. Appl. No. 12/188,161, dated Dec. 4, 2012, 12 pages.
Notice of Allowance received in U.S. Appl. No. 12/879,956, dated Feb. 21, 2013, 17 pages.
Restriction Requirement received in U.S. Appl. No. 12/188,161, dated Dec. 20, 2011, 5 pages.
Restriction Requirement received in U.S. Appl. No. 12/876,085, dated Jan. 27, 2012, 6 pages.
Restriction Requirement received in U.S. Appl. No. 12/705,492, dated Mar. 15, 2013, 5 pages.
Susitaival, et al., "Anaylizing the File Availability and Download Time in a P2P File Sharing System," IEEE, 2007, pp. 88-95.
Thinstall, "Application Virtualization: A Technical Overview of the Thinstall Application Virtualization Platform," Thinstall (Nov. 26, 2006 (retrieved from the Internet Archive Wayback Machine on Dec. 2, 2011 at http://web.archive.org/web/20061124201334/http://thinstall.com/products/respurces_geth.php?aid=5), 12 pages.
Final Office Action issued in U.S. Appl. No. 12/916,348, dated Jul. 11, 2013.
Notice of Allowance issued in U.S. Appl. No. 13/449,049, dated Aug. 13, 2013.
Final Office Action issued in U.S. Appl. No. 13/449,140, dated Jul. 22, 2013.
Final Office Action issued in U.S. Appl. No. 13/088,265, dated Jul. 25, 2013.
Non-Final Office Action issued in U.S. Appl. No. 12/685,576, dated Jun. 20, 2013.
Non-Final Office Action issued in U.S. Appl. No. 12/879,947, dated Jul. 10, 2013.
Notice of Allowance issued in U.S. Appl. No. 12/697,029, dated May 24, 2013.
Notice of Allowance issued in U.S. Appl. No. 12/188,155, dated Jun. 25, 2013.
Final Office Action issued in U.S. Appl. No. 12/906,904, dated Jul. 31, 2013.
Notice of Allowance issued in U.S. Appl. No. 12/877,918, dated Aug. 20, 2013.
Notice of Allowance issued in U.S. Appl. No. 12/188,161, dated Jan. 4, 2013.
Notice of Allowance issued in U.S. Appl. No. 12/876,082, dated May 10, 2013.
Notice of Allowance issued in U.S. Appl. No. 12/877,918, dated Apr. 26, 2013.
Final Office Action issued in U.S. Appl. No. 13/171,258, dated Jan. 11, 2013.
Notice of Allowance issued in U.S. Appl. No. 13/449,049, dated Apr. 29, 2013.
Non-Final Office Action issued in U.S. Appl. No. 13/171,258, mailed Apr. 29, 2014.
Hung, Eugene, et al.; "Using Behavior Templates to Design Remotely Executing Agents for Wireless Clients," 2004 4th Workshop on Applications and Services in Wireless Networks (ASWN), 2004.
Notice of Allowance issued in U.S. Appl. No. 12/876,085, dated Mar. 6, 2014.
Notice of Allowance issued in U.S. Appl. No. 12/188,155, dated Feb. 13, 2014.
Notice of Allowance issued in U.S. Appl. No. 13/088,265, dated Feb. 14, 2014.
Non-Final Office Action issued in U.S. Appl. No. 13/683,969, dated Feb. 28, 2014.
Notice of Allowance issued in U.S. Appl. No. 12/876,082, dated Feb. 28, 2014.
Non-Final Office Action issued in U.S. Appl. No. 13/918,067, dated Feb. 27, 2014.
Notice of Allowance issued in U.S. Appl. No. 12/916,348, dated Nov. 13, 2013.
Notice of Allowance issued in U.S. Appl. No. 12/876,085, dated Nov. 14, 2013.
Non-Final Rejection issued in U.S. Appl. No. 13/449,140, dated Nov. 15, 2013.
Notice of Allowance issued in U.S. Appl. No. 12/877,918, dated Dec. 13, 2013.

(56) References Cited

OTHER PUBLICATIONS

Notice of Allowance issued in U.S. Appl. No. 12/879,947, dated Jan. 27, 2014.
Restriction Requirement issued in U.S. Appl. No. 12/705,492, dated Aug. 6, 2014.
Notice of Allowance issued in U.S. Appl. No. 13/449,140, dated Aug. 11, 2014.
Non-Final Office Action issued in U.S. Appl. No. 12/916,348, dated Sep. 4, 2014.
Notice of Allowance issued in U.S. Appl. No. 12/695,107, dated Sep. 17, 2014.
Notice of Allowance issued in U.S. Appl. No. 12/705,492, dated Sep. 26, 2014.
Notice of Allowance issued in U.S. Appl. No. 12/876,082, dated Sep. 26, 2014.
Notice of Allowance issued in U.S. Appl. No. 12/697,029, dated Oct. 3, 2014.
Notice of Allowance issued in U.S. Appl. No. 12/906,904, dated Oct. 8, 2014.
USPTO; Notice of Allowance issued for U.S. Appl. No. 13/866,682; Oct. 28, 2014.
USPTO; Non-Final Office Action issued for U.S. Appl. No. 14/297,506; Nov. 6, 2014.
USPTO; Non-Final Office Action issued for U.S. Appl. No. 13/683,969; Nov. 14, 2014.
USPTO; Notice of Allowance issued for U.S. Appl. No. 13/918,067; Nov. 17, 2014.
Pei Zheng and Chen Wang; SODON: A High Availability Multi-Source Content Distribution Overlay; 2004; IEEE.

* cited by examiner

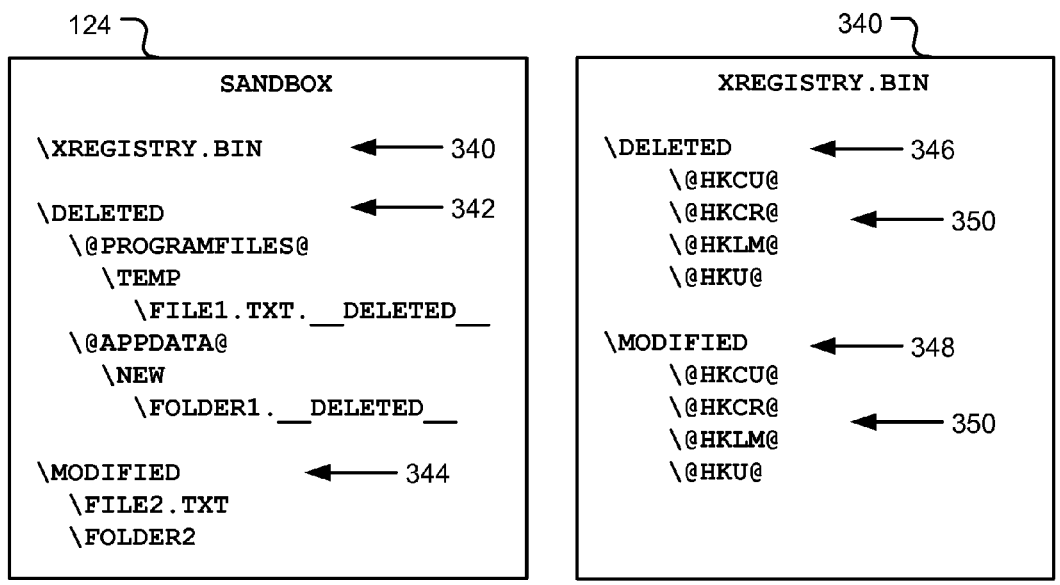

```
<?xml version="1.0" encoding="utf-16"?>
<Xenocode Version="6.0.236">
  <VirtualMachine>
    <Cab ID="1" Path="Media\FilesA.CAB" />
    <Cab ID="2" Path="Media\FilesB.CAB" />
    <VirtualLayers>
      <VirtualLayer Name="Default">           ← 208A
        <VirtualFilesystem>
          <Directory RootType="Application" Behavior="Merge" />
          <File Name="App.EXE"
            Hide="False"
            CabName=" App.EXE_1033"
            CabID="1"  />
          <File Name="App.DLL"
            Hide="False"
            CabName=" App.DLL_1033"
            CabID="1"  />
          <File Name="App2.DLL"           ← 205
            Hide="False"
            Source=".\Files\Default\System\App2.DLL" />
          ...
      <VirtualLayer Name="Win2k">          ← 208B
        <Condition Variable="OS" Operator="Equal" Value="Win2k" />
          ...
```

SANDBOX (124)

\XREGISTRY.BIN ← 340

\DELETED ← 342
  \@PROGRAMFILES@
    \TEMP
      \FILE1.TXT.__DELETED__
  \@APPDATA@
    \NEW
      \FOLDER1.__DELETED__

\MODIFIED ← 344
  \FILE2.TXT
  \FOLDER2

FIGURE 3

XREGISTRY.BIN (340)

\DELETED ← 346
  \@HKCU@
  \@HKCR@ ← 350
  \@HKLM@
  \@HKU@

\MODIFIED ← 348
  \@HKCU@
  \@HKCR@
  \@HKLM@ ← 350
  \@HKU@

FIGURE 4

METHOD OF CONFIGURING A VIRTUAL APPLICATION

BACKGROUND OF THE INVENTION

1. Field of the Invention

The present invention is directed generally to methods of configuring a virtual application.

2. Description of the Related Art

A virtual application is a virtual machine image pre-configured with all of the files, registry data, settings, components, runtimes, and other dependencies required for a specific application to execute immediately and without installation on a host computing device. The virtual application is isolated from other applications implemented on a host computing device and at least partially isolated from an underlying host operating system installed and executing on the host computing device. The virtual application is encapsulated from the host operating system by a virtual runtime environment, which includes a virtual operating system, that receives operations performed by the virtualized application and redirects them to one or more virtualized locations (e.g., a virtual filesystem, virtual registry, and the like).

The virtual application is stored in and implemented by one or more executable files. Depending upon the implementation details, the one or more executable files storing and implementing the virtual application may include blocks of data corresponding to each application file of a natively installed version of the application. Herein, these blocks of data will be referred to as "virtual application files." The one or more executable files storing and implementing the virtual application also include configuration information. When the virtual application is executed, the configuration information is used to configure the virtual operating system to execute the virtual application. For example, the configuration information may contain information related to the virtual application files, virtual registry entries, environment variables, services, and the like. The virtual operating system is configured to communicate with the host operating system as required to execute the virtual application on the host computing device.

As is apparent to those of ordinary skill in the art, the one or more executable files that store and implement the virtual application are read-only. Thus, if these read-only blocks of data are modified by the virtual application (or the virtual operating system) during execution, the modifications are stored in a readable and writable location referred to herein as a sandbox. The sandbox is a location on the host filesystem, a network share, a removable storage device, and the like whereat files may be created, modified, and deleted by the virtual application at runtime. For example, when the virtual operating system needs to create, modify, or delete a virtual application file, the virtual operating system does so in the sandbox. Similarly, if the virtual application modifies a virtual registry value, the virtual registry value is changed in the sandbox. The virtual operating system may also route some requests and actions to the host operating system for processing.

In some cases, a user may wish to configure the one or more executable files that store and implement the virtual application to include modifications that are easily made during runtime but are difficult to implement from outside the application. However, as discussed above, modifications made during runtime cannot be written into the one or more executable files that store and implement the virtual application. Therefore, a need exists for a method or system for merging changes made during runtime into the one or more executable files that store and implement the virtual application. The present application provides these and other advantages as will be apparent from the following detailed description and accompanying figures.

BRIEF DESCRIPTION OF THE SEVERAL VIEWS OF THE DRAWING(S)

FIG. 2 is an example of a configuration file for use with the virtual application authoring tool of FIG. 1.

FIG. 3 illustrates contents of an exemplary sandbox used by a virtual application of FIG. 1.

FIG. 4 illustrates contents of an exemplary binary file used by a virtual application of FIG. 1 to store modifications to a virtual registry.

Figure 6:
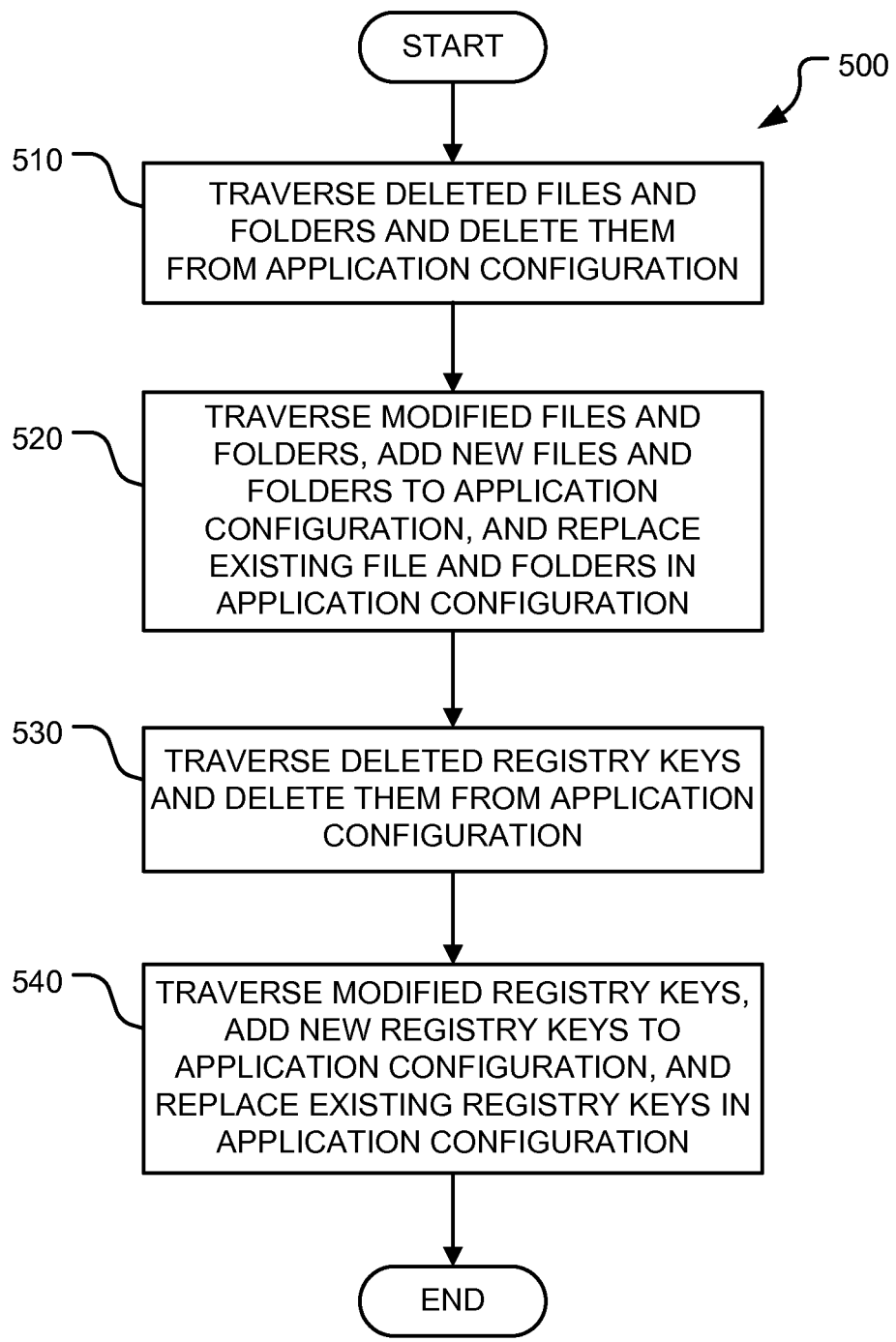

FIG. 6 a flow diagram of a method of reading the contents of the sandbox and writing them to application configuration.

Figure 1:
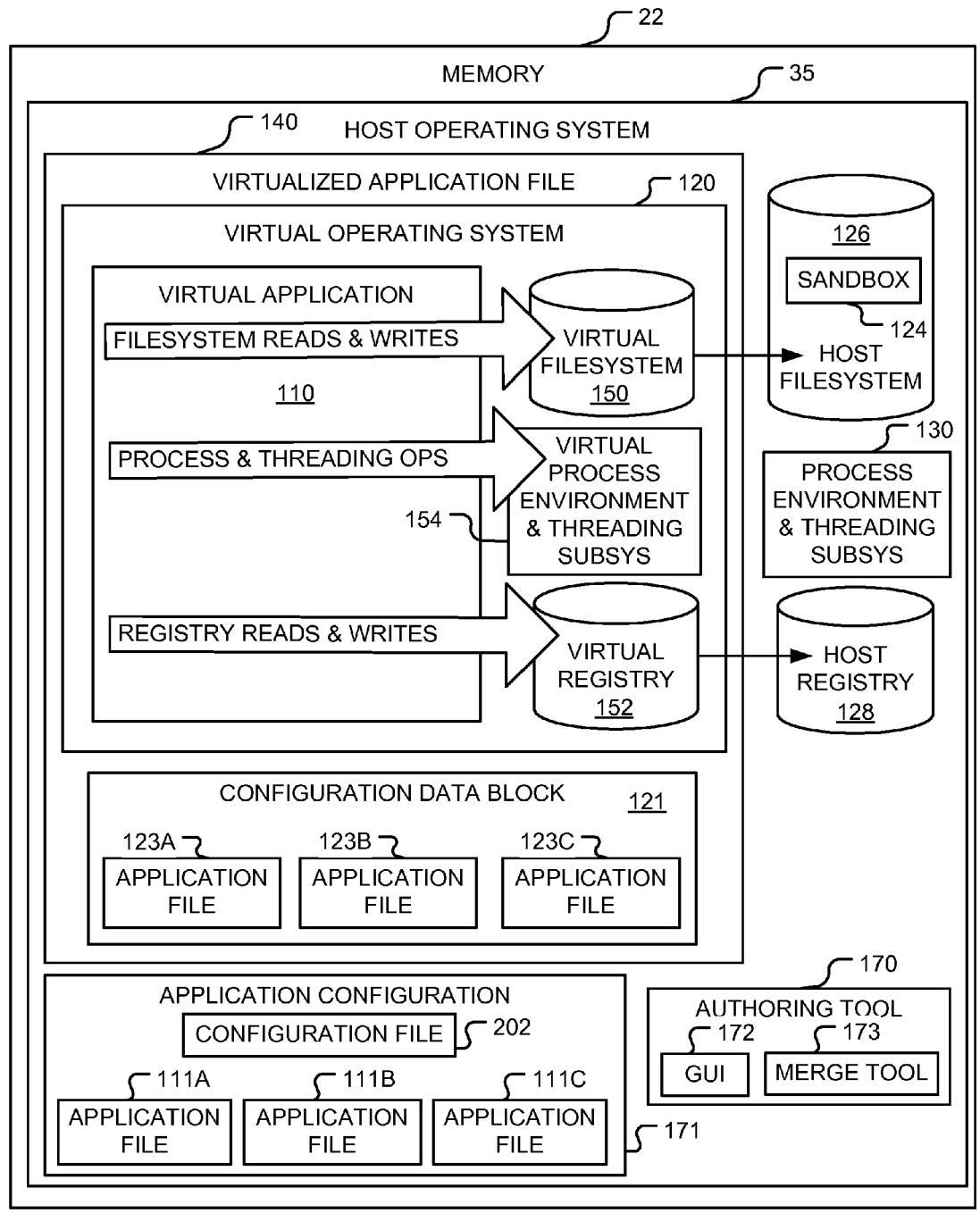
FIG. 1 is an illustration of a conceptualization of software components stored in memory and executing on a host computing device, the software components include a virtualized application file, and a virtual application authoring tool.
Figure 7:
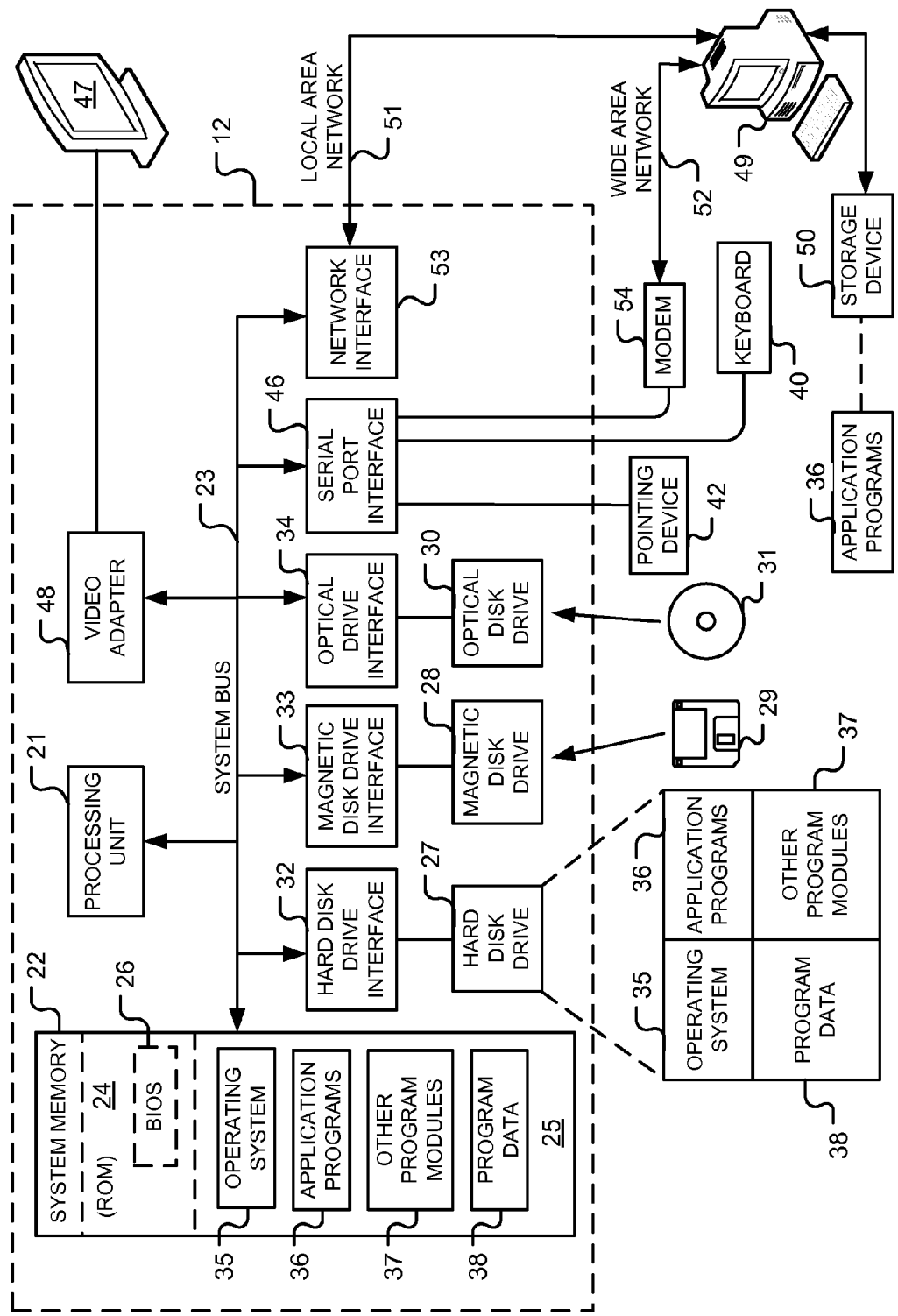

FIG. 7 is a diagram of a hardware environment and an operating environment in which the computing device of the system of FIG. 1 may be implemented.

DETAILED DESCRIPTION OF THE INVENTION

FIG. 1 illustrates a system memory 22 storing a conventional host operating system 35, that like most operating systems, includes a host filesystem 126, a host registry 128, and a process environment and threading subsystems component 130. The system memory 22 also stores an executable virtualized application file 140 configured to execute on the host operating system 35, without having been installed on the host operating system 35.

The virtualized application file 140 includes components necessary to implement a virtual runtime environment including a virtual operating system 120 configured to execute in the host operating system 35. A virtual application 110 is configured to execute on the virtual operating system 120. In the embodiment illustrated a single virtual application file is used to implement both the virtual operating system 120 and the virtual application 110. However, those of ordinary skill in the art appreciate that more than one virtual application file may be used to implement the virtual operating system 120 and the virtual application 110.

The virtual operating system 120 includes a virtual filesystem 150, a virtual registry 152, and a virtual process environment and threading subsystems component 154. The virtual application 110 interacts with the virtual filesystem 150, virtual registry 152, and virtual process environment and threading subsystems component 154, instead of interacting directly with the host filesystem 126, the host registry 128, and the process environment and threading subsystems component 130 of the host operating system 35. The virtual operating system 120 is configured to communicate with the host operating system 35 as required to execute the virtual application 110.

The virtualized application file 140 includes a configuration data block 121. The configuration data block 121 may include virtual application files 123A-123C corresponding to each of application files of a natively installed version of the same application. The virtualized application file 140 identifies one or more of the virtual application files 123A-123C as a startup executable that executes when the virtual application 110 is first executed. The startup executable may be identified in the configuration data block 121.

When the virtualized application file 140 is executed, the configuration data block 121 configures the virtual operating system 120 to execute the virtual application. For example, the configuration data block 121 may contain configuration information related to files and directories in the virtual filesystem 150, keys and values in the virtual registry 152, environment variables, services, and the like.

The configuration data block 121 may also include basic application metadata and settings such as the application name, application version, and sandbox location. Further, the configuration data block 121 may provide isolation information to the virtual operating system 120. This information indicates which directories, virtual application files 123A-123C, virtual registry entries, environment variables, and services are to be isolated from the host operating system 35. The configuration data block 121 may also include one or more virtual layers. Each virtual layer may identify files, registry entries, environment variables, and services. As the virtual layers are read, the corresponding files, registry entries, environment variables, and services are added to appropriate runtime data-structures.

While illustrated as being outside the virtual filesystem 150, those of ordinary skill in the art appreciate that the application files 123A-123C may be conceptualized as being within the virtual filesystem 150 when the virtual application 110 is executing.

To execute the virtual application 110, an initialization process is first performed. During this process, the virtual operation system 120 is launched and configured by the configuration data block 121. After the initialization process has completed, the appropriate startup executable(s) is/are launched inside the virtual operating system 120. The virtual operating system 120 intercepts calls to the host operating system 35 and routes them to corresponding components of the virtual operating system 120. For example, when the virtual application 110 requests access an application file that corresponds to the virtual application file 123A using a path of a natively installed version of the application, the virtual operating system 120 intercepts the request and routes the request to one of the virtual application file 123A. The virtual operating system 120 may also route some requests and actions to the host operating system 35 for processing.

U.S. patent application Ser. No. 12/188,155, filed on Aug. 7, 2008, and U.S. patent application Ser. No. 12/188,161 also filed on Aug. 7, 2008, both of which are incorporated herein by reference in their entireties, disclose a system that may be used to create the virtualized application file 140. As described in greater detail in U.S. patent application Ser. Nos. 12/188,155 and 12/188,161, the virtualized application file 140 may be created by a virtual application executable constructor or authoring tool 170 using an application template that includes copies of files, such as a configuration file 202, application files, and the like, used to configure the virtualized application file 140. However, the template is not a requirement. Instead, to build the virtualized application file 140, the authoring tool 170 needs only the configuration file 202 and copies of any applications files necessary for a natively installed version of the application to execute. Depending upon the implementation details, the configuration file 202 may be viewed as a project file created using the authoring tool 170. In other words, the authoring tool 170 may be used to create and modify the configuration file 202.

The configuration file 202 includes application settings, configuration information, and identifies application files to be incorporated into the virtual application 110. References to files inside the configuration file 202 are relative to the location in which the configuration file 202 is stored. For example, files may be stored in subdirectory ".\Files" located in the same directory in which the configuration file 202 is stored. Example contents of an exemplary configuration file 202 are depicted in FIG. 2. By way of a non-limiting example, the configuration file 202 may be implemented as an XML file containing information for the virtual application 110 related to the virtual filesystem 150, the virtual registry 152, the virtual process environment and threading subsystems component 154 (e.g., services, environment variables, and the like), and the startup executable(s).

The information in the configuration file 202 may be stored in layers 208A and 208B, labeled "VirtualLayers." These layers include a default layer 208A ("<VirtualLayer Name="Default">") having default settings. In addition to the default settings of the default layer 208A, the configuration file 202 may include one or more conditional layers, such as the layer 208B ("<VirtualLayer Name="Win2K">") that specify settings specific to particular operating systems and/or versions thereof.

Returning to FIG. 2, the configuration file 202 includes one or more filesystem configuration portions. For example, each layer 208A and 208B may include a filesystem configuration portion. In the embodiment illustrated, the layer 208A includes a filesystem configuration portion 204. The configuration file 202 references physical files (e.g., application files 111A-111C) accessible by the authoring tool 170. The references are organized in the configuration file 202 in a hierarchy that corresponds to the hierarchy in which the application files are organized by a natively installed version of the application. The hierarchy typically includes well-known root folders. FIG. 2 illustrates an exemplary reference 205 to a physical file named "App2.dll" that may be found at ".\Files\Default\System\App2.DLL." As mentioned above, the reference is relative to the storage location of the configuration file 202.

Turning to FIG. 1, the application files referenced by the configuration file 202 and the configuration file itself are referred to collectively as an application configuration 171. Each time the application configuration 171 is used to create a copy of the virtualized application file 140, the same configuration information is used. However, it may be desirable to modify the application configuration 171 to include modifications that can be readily made by the virtual application 110 itself during runtime. In other words, in certain circumstances, it may be useful to merge changes made by the virtual application 110 during execution into the application configuration 171 so that the next copy of the virtualized application file 140 created includes those modifications.

As shown in FIG. 1, in the embodiment illustrated, the virtualized application file 140 is read-only to the virtual application 110. If the information stored in the virtualized application file 140 is modified by the virtual application 110 during its execution, the modifications are stored in a readable and writable storage location referred to herein as a sandbox 124. The sandbox 124 is a location on the host filesystem 126, a network share, a removable storage device, and the like. For illustrative purposes, the sandbox 124 will be described as a directory named "Virtual" in the host filesystem 126.

In the sandbox 124, files may be created, modified, and deleted by the virtual application 110. For example, when the virtual operating system 120 needs to create, modify, or delete one of the virtual application files 123A-123C, the virtual operating system 120 does so in the sandbox 124. Similarly, if the virtual application 110 modifies a key in the virtual registry 152, the modification is stored in the sandbox 124.

As is apparent to those of ordinary skill in the art, the virtualized application file 140, when executed, may generate a user interface. Modifications made to the virtual application 110 and stored in the sandbox 124 may be controlled or directed by a user operating the user interface.

At any particular instance in time, the virtual filesystem 150 (including the virtual application files 123A-123C) and the virtual registry 152 (as modified by information stored in the sandbox 124) are a snapshot of an instantaneous state of the virtual application 110. In that instance, the sandbox 124 is where runtime changes to the virtual filesystem 150 and/or the virtual registry 152 for the virtual application 110 have been stored. Thus, information related to the instantaneous state of the virtual application 110 is stored in the sandbox 124 and cannot be written by the virtual application 110 to the read-only virtualized application file 140.

FIG. 3 illustrates a non-limiting exemplary implementation of a file organizational structure that may be used to implement the sandbox 124. By way of a non-limiting example, the sandbox 124 may include a subfolder and/or file that stores modifications to the virtual registry 152. In FIG. 3, modifications to the virtual registry 152 are stored in a file 340 named "XRegistry.bin," which stores modifications to the virtual registry 152 in a binary format.

The sandbox 124 may include one or more subfolders, such as a subfolder 342 named "Deleted" and a subfolder 344 named "Modified," that store changes made to the virtual filesystem 150. In this example, the subfolder 342 named "Deleted" stores identifications and/or copies of deleted files and folders. In FIG. 3, a file named "FILE1.TXT" located at "\Deleted\@PROGRAMFILES@\temp\" and a folder named "FOLDER1" located at "\Deleted\@APPDATA@\new\" have both been identified as having been deleted by the virtual application 110 (see FIG. 1) during execution.

The name of a deleted file may include its original file name followed by an identifier indicating the file has been deleted. For example, in FIG. 3, a character string (such as "._deleted_") may be used as the identifier. Folders that have been deleted also include their original folder name followed by an identifier indicating the folder has been deleted. For example, in FIG. 3, the character string "._deleted_" has been used as the identifier that indicates a folder has been deleted. Folders that do not include this identifier are merely part of a file path (i.e., a placeholder). For example, a folder named "new" identified in the file path of the fold "FOLDER1._deleted_" does not include the identifier and therefore, was not deleted by the virtual application 110 (see FIG. 1).

The subfolder 344 named "Modified" stores identifications and/or copies of modified virtual application files and/or related folders. For example, the subfolder 344 named "Modified" may include a complete copy of virtual application files as modified by the virtual application 110 (see FIG. 1). Alternatively, the subfolder 344 named "Modified" may include information that identifies one or more modified virtual application files and which changes have been made to the files. In FIG. 3, a modified virtual application file named "FILE2.TXT" and a folder named "FOLDER2" have been identified as having been modified (i.e., created or revised in some manner). As is apparent to those of ordinary skill in the art, a virtual application file created by the virtual application 110 (see FIG. 1) during its execution may not correspond to an application file of the natively installed version of the same application.

In the prior art, to modify the virtualized application file 140, the user had to manually edit either the virtualized application file 140 or the files used to create the virtualized application file 140. For example, if the user wished to add a word to a dictionary used by a spell checking process of the virtual application 110, using prior art methods, the user had to locate where (in the natively installed application files) the dictionary was stored, possibly reverse engineer the format of the application file storing the dictionary, and add the word to the dictionary.

Referring to FIG. 1, a sandbox merge tool 173 may be used to merge modifications made to the state of the virtual application 110 and/or virtual operating system 120 by the virtual application 110 itself during runtime, into the application configuration 171 in the appropriate locations. Using this approach, to add a word to the dictionary used by the spell checking process of the virtual application 110, the user would simply execute the virtual application 110 and use whatever mechanisms are provided by the virtual application (e.g., user interface components) to add the word to the dictionary. This modification would be stored by the virtual application 110 and/or the virtual operating system 120 in the sandbox 124. Then, the user would use the sandbox merge tool 173 to modify the application file (e.g., one of the application files 111A-111C) stored in the application configuration 171 that includes the dictionary to include the word. Therefore, the next time the application configuration 171 is used to create a new copy of the virtualized application file 140, the new word will be in the dictionary used by the spell checking process.

U.S. patent application Ser. Nos. 12/188,155 and 12/188,161 disclose a snapshot technique or process that identifies changes made to a platform by a native installation of the application. The sandbox merge tool 173 may be used to make modifications to an existing application configuration 171 without requiring the user to repeat the snapshot process to re-snapshot the entire application. Thus, the sandbox merge tool 173 may save time over repeating the snapshot process. In particular implementations, the sandbox merge tool 173 may be used to integrate configuration customizations into the application configuration 171 that were made manually after the initial snapshot is recorded.

The sandbox merge tool 173 reads the contents of the sandbox 124 and writes them to the application configuration 171. Thus, to modify the virtualized application file 140, the user need not understand the inner workings of the virtual application 110, the structures of the application configuration 171, or the formats of the files included in the application configuration 171. Further, the user need not even know what modifications are stored in the sandbox 124.

By way of a non-limiting example, the sandbox merge tool 173 may be implemented as a component of the authoring tool 170 described in greater detail in U.S. patent application Ser. Nos. 12/188,155 and 12/188,161. The sandbox merge tool 173 may be directed to merge modifications stored in the sandbox 124 into the application configuration 171 via a user interface (e.g., a graphical user interface 172) provided by the authoring tool 170. The user may use a separate user interface provided by the virtualized application file 140 to instruct the virtual application 110 to store modifications made to the virtual application 110 and/or the virtual operating system 120 in the sandbox 124. Thus, two separate user interfaces provided by two separate applications (i.e., the virtual application 110 and the authoring tool 170) may be used. Further, the modifications stored in the sandbox 124 may be merged into the application configuration 171 after execution of the virtual application 110 has terminated.

Figure 5:
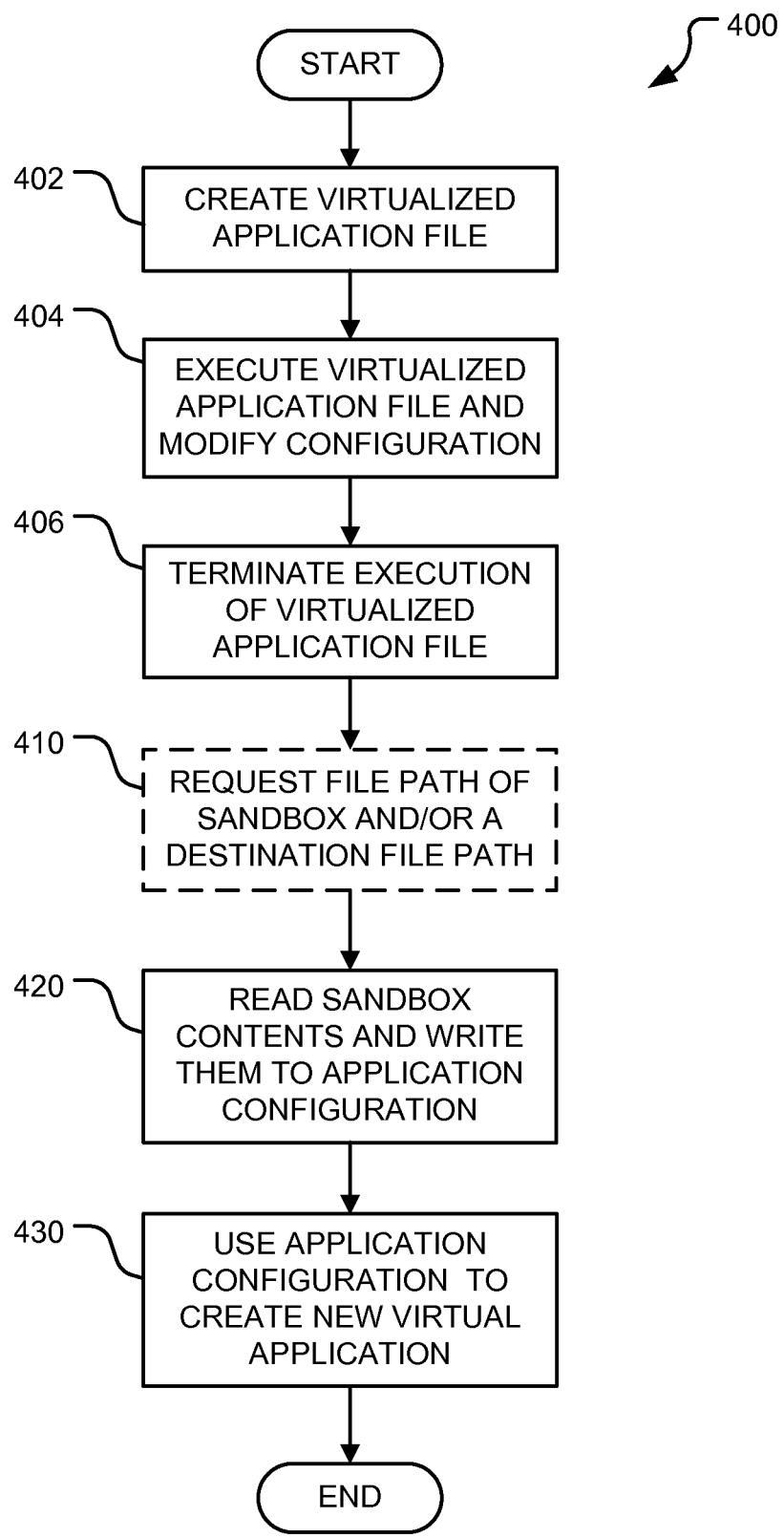
FIG. 5 is a flow diagram of a method of modifying an application configuration.

FIG. 5 provides a flow diagram of a method 400. The following description of the method 400 also references the components illustrated in FIG. 1. In first block 402, the user uses the authoring tool 170 to create the virtualized application file 140. In next block 404, the user executes the virtualized application file 140 and makes one or more desired changes to the configuration of the virtual application 110. Then, in block 406, the user closes or otherwise terminates execution of the virtual application 110.

To perform the sandbox merge process, the sandbox merge tool 173 needs to know the location (e.g., file path) of the sandbox 124, and a destination location for a resulting merged file. In optional block 410 of the method 400, the sandbox merge tool 173 may request identification of the location of the sandbox 124. For example, the sandbox merge tool 173 may display a dialog box requesting the file path of the sandbox 124. Optionally, a default file path may be provided. By way of a non-limiting example, the default file path may be the file path specified for the last virtual application created by the authoring tool 170.

In optional block 410, the sandbox merge tool 173 may also request identification of the destination file path on the host filesystem 126 in which to store the resulting merged file. By way of a non-limiting example, the location in which the virtualized application file 140 is stored may be used as the destination location. In other words, the virtualized application file 140 may be overwritten. Alternatively, a new file may be created by the method 400. By way of a non-limiting example, the sandbox merge tool 173 may display a dialog box requesting the destination file path.

Next, in block 420, the contents of the sandbox 124 are read from the location identified by the sandbox file path and written to the application configuration 171. Finally, in block 430, the application configuration 171 is used to create a new copy of the virtualized application file 140 stored in the location identified by the destination file path. Then, the method 400 terminates.

FIG. 6 is flow diagram of an exemplary implementation of a method 500 which may be performed by the sandbox merge tool 173 in block 420 of the method 400 illustrated in FIG. 5. The following description of the method 500 also references the components illustrated in FIG. 1.

In first block 510, the sandbox merge tool 173 identifies any deleted virtual application files and/or folders from the information stored in the sandbox 124 and deletes the files and/or folders identified from the application configuration 171. As mentioned above, the sandbox 124 may include one or more subfolders or sub-directories. In the embodiment illustrated, deleted files and/or folders are identified and/or stored in the subfolder 342 named "Deleted." Within the subfolder 342 named "Deleted," the files and/or folders to be deleted may be identified using the well-known root folders (such as @PROGRAMFILES@, @APPDATA@, etc.) that correspond to root nodes in the filesystem configuration portion 204 of the configuration file 202 of the application configuration 171. In other words, a file path corresponding to the file path provided in the filesystem configuration portion 204 may be specified for each virtual application file or folder to be deleted. Using the specified file paths, the correct portions of the application configuration 171 (i.e., references to the deleted files in the filesystem configuration portion 204 and copies of the deleted files) may be located and deleted.

For example, if the subfolder 342 named "Deleted" identifies the virtual application file "\@PROGRAMFILES@\temp\test.exe._deleted_" for deletion, the sandbox merge tool 173 determines where in the application configuration 171 this file is located and deletes the file from the application configuration 171. References to the file to be deleted may also be deleted from the filesystem configuration portion 204 of the configuration file 202.

Within the subfolder 342 named "Deleted," the deleted folders may be traversed depth first, and the files and folders deleted from the application configuration 171, which may, depending upon the implementation details, include deletion of the files and folders from application configuration 171 and deletion of references to those files and folders from the configuration file 202 as they are encountered during the traversal. As is appreciated by those of ordinary skill in the art, the phrase "depth first" indicates that the contents of the present node (e.g., a folder, a key, etc.) are traversed before the contents of sibling nodes are traversed. The following pseudo-code provides a non-limiting example of this process:

```
foreach (directory in "Virtual\Deleted")
    ReadDeletedFiles (directory);
void ReadDeletedFiles (directory)
{
    foreach (file in directory.GetFiles ( ))
        fileNode = configuration. GetNodeFromPath (file.GetPath ( ));
        configuration.RemoveFile (fileNode);
    foreach (childDirectory in directory.GetDirectories ( ))
        if (childDirectory.Name.EndsWith ("._deleted"))
            childNode = configuration.GetNodeFromPath
(childDirectory.GetPath ( ));
            configuration.RemoveDirectory (childNode);
        else
            ReadDeletedFiles (childDirectory);
}
```

Next, in block 520, the sandbox merge tool 173 traverses modified virtual application files and folders in the sandbox 124, and attempts to locate corresponding files and/or folders in the application configuration 171. If a corresponding file or folder is located by the sandbox merge tool 173, the sandbox merge tool 173 replaces the corresponding file or folder with the modified version stored in the sandbox 124. On the other hand, if a corresponding file or folder is not located by the sandbox merge tool 173, the sandbox merge tool 173 adds the new file or folder to the application configuration 171.

In the embodiment illustrated, modified files and/or folders are stored in the subfolder 344 named "Modified." Within the subfolder 344 named "Modified," the files and/or folders to be modified may be identified using the same well-known root folders (such as @PROGRAMFILES@, @APPDATA@, etc.) used with respect to the subfolder 342 named "Deleted."

Within the subfolder 344 named "Modified," the modified folders may be traversed depth first, and the files and folders modified or replaced in the application configuration 171. Depending upon the implementation details, this may include replacing the files and folders in application configuration 171 with the version stored in the sandbox 124, and modifying references to those files and folders in the configuration file 202 as they are encountered during the traversal If during the traversal, a new file or folder is discovered that is not in the application configuration 171, the new file or folder is added to the application configuration 171. References to the new file or folder may also be added to the configuration file 202 as necessary.

In present embodiment, if a virtual application file identified in the subfolder 344 named "Modified" corresponds to a file in the application configuration 171, the file in the application configuration 171 is replaced with the corresponding file identified in the subfolder 344 named "Modified." Thus, all files identified in the subfolder 344 named "Modified" are copied into the application configuration 171.

The following pseudo-code provides a non-limiting example of a method of traversing the subfolder 344 named "Modified" and modifying the application configuration 171 to include the modified files or folders encountered during the traversal:

```
foreach (directory in "Virtual\Modified")
    ReadModifiedFiles (directory);
void ReadModifiedFiles (directory)
{
    foreach (file in directory.GetFiles ( ))
        fileNode = configuration. GetNodeFromPath (file.GetPath ( ));
        configuration.ReplaceExistingFile (fileNode, file)
    foreach (childDirectory in directory.GetDirectories ( ))
        ReadModifiedFiles (childDirectory)
}
```

Next, in block 530, the sandbox merge tool 173 traverses the deleted registry keys stored in the sandbox 124 and deletes the deleted registry keys from the application configuration 171. As is apparent to those of ordinary skill in the art, a registry (such as the host registry 128 and the virtual registry 152) may be implemented as a hierarchical database that contains data critical for the operation of the operating system and the applications and services that run on the operating system. This data may be structured in a tree or hierarchy, wherein each node in the hierarchy is referred to as a key. The registry may be divided into hives. Each hive is a logical group of keys, sub-keys, and values associated with a set of supporting files containing backups of the data stored in the hive. As is apparent to those of ordinary skill in the art, the virtual registry 152 may include one or more hives. In the present embodiment, the virtual registry 152 includes four hives: (1) a Current User hive; (2) a Classes Root hive; (3) a Local Machine hive; and (4) a Users hive.

As mentioned above, in the present exemplary embodiment illustrated in FIGS. 3 and 4, modifications made to the virtual registry 152 (see FIG. 1) are stored in the binary file 340 named "XRegistry.bin." The binary file contains a signature header, a version, and a tree or hierarchical structure for modifications made to the virtual registry 152. The tree structure in the binary file 340 may also be organized into hives. By way of a non-limiting example, the tree structure in the binary file 340 may include a hive 346 for deleted keys, and a separate hive 348 for modified keys. Each of the hives 346 and 348 may include sub-nodes 350 that each represent a hive of the virtual registry 152 (see FIG. 1). For example, the hive 346 for deleted keys, and the hive 348 for modified keys may each include four sub-nodes shown in a right-hand column of Table A below that correspond to hives of the virtual registry 152 shown in a left-hand column of Table A.

TABLE A

| Sub-node Name | Corresponding Hive in Virtual Registry |
| --- | --- |
| @HKCU@ | Current User |
| @HKCR@ | Classes Root |
| @HKLM@ | Local Machine |
| @HKU@ | Users |

Returning to FIG. 1, the application configuration 171 includes registry configuration information that is incorporated into the virtualized application file 140 and used to configure the hives of the virtual registry 152 at runtime. For example, registry configuration information may be stored in the configuration file 202 and incorporated into the configuration data block 121 of the virtualized application file 140 by the authoring tool 170. Optionally, the registry configuration information may include one or more files that are incorporated into the configuration data block 121 of the virtualized application file 140 by the authoring tool 170.

The registry configuration information stored in the configuration file 202 may be organized in the same hierarchy and tree structure used by the virtual registry 152. Thus, the sub-nodes 350 in both the hive 346 for deleted keys and the hive 348 for modified keys may correspond directly to the hierarchy and tree structure used by the configuration file 202. In other words, the sub-nodes 350 of the hive 346 for deleted keys, and the sub-nodes 350 of the hive 348 for modified keys may be identical to the hives of the configuration file 202. Further, each of the sub-nodes 350 may themselves include sub-nodes (not shown) that correspond to sub-nodes of the corresponding hive of the configuration file 202.

Deleted keys (which correspond to nodes of the tree structure) may be identified in the same manner deleted files or folders are identified. For example, the name of a deleted key may include its original name followed by the character string "._deleted_." Identifiers of nodes or keys that do not include this character string may function as placeholders. The hive 346 for deleted keys may be traversed depth first, and the keys deleted from the configuration file 202. Similarly, files associated with the deleted keys, if any, may be deleted from the application configuration 171. The following pseudo-code provides a non-limiting example of this process:

```
foreach (key in deletedKeys)
    ReadDeletedKeys (key);
void ReadDeletedKeys (key)
{
    foreach (childKey in key.GetSubKeys ( ))
        if (childKey.Name.EndsWith ("._deleted"))
            childNode = configuration.GetNodeFromPath
            (childKey.GetPath ( ));
            configuration.RemoveKey (childNode);
        else
            ReadDeletedKeys (childKey);
}
```

Returning to FIG. 6, in block 540, the sandbox merge tool 173 traverses the modified registry keys stored in the sandbox 124 (e.g., in the binary file 340 illustrated in FIGS. 3 and 4), adds any new registry keys encountered during the traversal to the configuration file 202, and modifies existing registry keys in the configuration file 202 corresponding to modified keys encountered during the traversal. Then, the method 500 terminates.

In the present embodiment, in block 540, the sandbox merge tool 173 traverses the modified registry keys by traversing the hive 348 for modified keys in the binary file 340. A registry key faults into the hive 348 for modified keys when any value in the key is changed or deleted, or when a sub-key faults into the hive 348 for modified keys. When a registry key is faulted into the hive 348 for modified keys, all values associated with the faulted key are also faulted into the hive 348. In the hive 348, the name of a faulted key (or node) corresponds directly to the key name used by the virtual registry 152. Further, the value names and values associated with the faulted key correspond directly to the value names and values used by the virtual registry 152.

If a faulted key corresponds to an existing key in the configuration file 202, the authoring tool 170 clears the values associated with the corresponding existing key and replaces them with the values associated with the faulted key. If a faulted key does not correspond to an existing key in the configuration file 202, a new key is created in the configuration file 202 for the faulted key, and the values associated with the faulted key are added to the configuration file 202. The hive 348 for modified keys may be traversed depth first, and the keys in the configuration file 202 updated or modified as they are encountered during the traversal. The following pseudo-code provides a non-limiting example of this process:

```
foreach (key in modifiedKeys)
    ReadModifiedKeys (key);
void ReadModifiedKeys (key)
{
    keyNode = configuration.GetNodeFromPath (key.GetPath ( ));
    configuration.ClearAllValues (keyNode);
    foreach (value in key.GetValues ( ))
        valueNode = configuration.GetNodeFromPath (value.GetPath ( ));
        configuration.AddValue (valueNode, value);
    foreach (childKey in key.GetSubKeys ( ))
        ReadModifiedKeys (childKey);
}
```

FIG. 7 is a diagram of hardware and an operating environment in conjunction with which implementations of the virtualized application file 140, the authoring tool 170, and/or the sandbox merge tool 173 may be practiced. The description of FIG. 7 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 7 includes a general-purpose computing device in the form of a computing device 12. Each of the virtualized application file 140, the authoring tool 170, and/or the sandbox merge tool 173 may be implemented using one or more computing devices like the computing device 12. By way of non-limiting example, the virtualized application file 140, the authoring tool 170, and the sandbox merge tool 173 may be implemented on the computing device 12.

The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 7 include a local-area network (LAN) 51 and a wide-area network (WAN) 52. Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

Returning to FIG. 1, the host operating system 35, the virtualized application file 140, the authoring tool 170, and the sandbox merge tool 173 may be stored as computer executable components on the system memory 22. Each of the host operating system 35, the virtualized application file 140, the authoring tool 170, and the sandbox merge tool 173 may be implemented using software components that are executable by the processing unit 21 and when executed perform the functions described above.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method performed by a computing device, the method comprising:
   reading, by the computing device, from a memory location, modifications to a virtual application implemented by a first read-only virtualized application file, the first read-only virtualized application file having been created using application configuration information, the modifications having been stored in the memory location by the virtual application during runtime;
   writing, by the computing device, the modifications read from the memory location to the application configuration information to create modified application configuration information; and
   creating, by the computing device, a second read-only virtualized application file based on the modified application configuration information, the second read-only virtualized application file including the modifications made to the virtual application by the virtual application during runtime.

2. The method of claim 1, wherein first read-only virtualized application file is an executable file, and the method further comprises:
   executing, by the computing device, the first read-only virtualized application file before reading the modifications from the memory location.

3. The method of claim 1, wherein the application configuration information comprises a virtual registry configuration portion,
   the first read-only virtualized application file comprises a virtual registry,
   the modifications stored in the memory location comprise a modification made to the virtual registry by the virtual application during runtime, and
   writing the modifications to the application configuration information comprises writing the modification made to the virtual registry to the virtual registry configuration portion of the application configuration information.

4. The method of claim 1, wherein the application configuration information comprises a virtual registry configuration portion,
   the first read-only virtualized application file comprises a virtual registry,
   the virtual application implemented by the first read-only virtualized application file writes modifications made to the virtual registry into a hierarchy in a binary file stored in the memory location, and reading the modifications from the memory location comprises traversing the hierarchy in the binary file to identify modifications made to the virtual registry.

5. The method of claim 1, wherein the application configuration information comprises an application file,
the first read-only virtualized application file comprises a portion corresponding to the application file,
the modifications stored in the memory location comprise modifications to the portion of the first read-only virtualized application file corresponding to the application file, and
writing the modifications to the application configuration information comprises modifying the application file based on the modifications to the portion of the first read-only virtualized application file made by the virtual application during runtime.

6. The method of claim 1, wherein the application configuration information comprises an application file,
the first read-only virtualized application file comprises a portion corresponding to the application file,
the modifications stored in the memory location comprise a modified version of the application file as modified by the virtual application during runtime,
the modified version is created by the virtual application based on the portion of the first read-only virtualized application file corresponding to the application file, and
writing the modifications to the application configuration information comprises replacing the application file of the application configuration information with the modified version of the application file stored in the memory location.

7. The method of claim 1, wherein the first read-only virtualized application file being configured to implement a virtual filesystem,
the application configuration information comprises a virtual filesystem configuration portion used to configure the virtual filesystem,
the modifications stored in the memory location comprise modifications to the virtual filesystem, and
writing the modifications to the application configuration information comprises modifying the virtual filesystem configuration portion based on the modifications to the virtual filesystem made by the virtual application during runtime.

8. The method of claim 1, wherein the first read-only virtualized application file is configured to implement a virtual filesystem,
the application configuration information comprises a virtual filesystem configuration portion used to configure the virtual filesystem,
the virtual filesystem configuration portion is organized according to a predetermined organizational structure,
the modifications stored in the memory location are also organized according to the predetermined organizational structure,
the modifications stored in the memory location comprise modifications to the virtual filesystem stored in the predetermined organizational structure, and
writing the modifications to the application configuration information comprises:
traversing the predetermined organizational structure used to store the modifications in the memory location; and
modifying portions of the predetermined organizational structure of the virtual filesystem configuration portion corresponding to the traversed portions of the predetermined organizational structure of the memory location.

9. A computer-implemented method of creating a second virtualized application file based on an application configuration used to create a first virtualized application file, both the first and second virtualized application files being read-only and implementing virtualized versions of an application, the method comprising:
executing, by a computing system, the first virtualized application file, during execution, the first virtualized application file implementing a first virtualized version of the application that writes configuration modifications to a sandbox memory location as the first virtualized application file executes;
terminating, by the computing system, execution of the first virtualized application file;
without executing the first virtualized application file, reading, by the computing system, the configuration modifications from the sandbox memory location;
without executing the first virtualized application file, writing, by the computing system, the configuration modifications to the application configuration used to create the first virtualized application file; and
after the configuration modifications have been written to the application configuration, creating, by the computing system, the second virtualized application file based on the modified application configuration, when executed, the second virtualized application file implementing a second virtualized version of the application.

10. The method of claim 9, wherein the first virtualized application file comprises blocks of data corresponding to application files in a natively installed version of the application, and the configuration modifications to the virtual application comprise modifications to blocks of data of the first virtualized application file.

11. The method of claim 9, wherein the application configuration comprises files corresponding to application files in a natively installed version of the application,
the first virtualized application file comprises blocks of data corresponding to files in the application configuration,
the configuration modifications to the virtual application comprise information indicating one or more of the blocks of data of the first virtualized application file have been deleted, and
writing the configuration modifications to the application configuration comprises deleting one or more files from the application configuration corresponding to the one or more of the blocks of data indicated by the information as having been deleted.

12. The method of claim 11, wherein the files in the application configuration corresponding to the application files in the natively installed version of the application are arranged in a hierarchy,
the information indicating the one or more of the blocks of data of the first virtualized application file have been deleted is arranged in a hierarchy corresponding to the hierarchy in which the files are organized in the application configuration, and
reading the configuration modifications from the sandbox memory location comprises traversing the hierarchy of the information indicating the one or more of the blocks of data of the first virtualized application file have been deleted.

13. The method of claim 11, wherein the configuration modifications to the virtual application comprise information indicating one or more of the blocks of data of the first virtualized application file have been modified, and writing the configuration modifications to the application configuration comprises modifying one or more files from the application configuration corresponding to the one or more of the blocks of data indicated by the information as having been modified.

14. The method of claim 13, wherein the files in the application configuration corresponding to the application files in the natively installed version of the application are arranged in a hierarchy, the information indicating the one or more of the blocks of data of the first virtualized application file have been modified is arranged in a hierarchy corresponding to the hierarchy in which the files are organized in the application configuration, and reading the configuration modifications from the sandbox memory location comprises traversing the hierarchy of the information indicating the one or more of the blocks of data of the first virtualized application file have been modified.

15. The method of claim 11, wherein the configuration modifications to the virtual application comprise information indicating one or more new blocks of data have been created for use by the first virtualized application file, and writing the configuration modifications to the application configuration comprises adding one or more files into the application configuration corresponding to the one or more new blocks of data indicated by the information as having been created.

16. The method of claim 9, wherein the application configuration comprises information for configuring a plurality of registry keys, the first virtualized application file comprises a block of data storing a plurality of registry keys, the configuration modifications to the virtual application comprise information indicating one or more of the plurality of registry keys of the first virtualized application file have been deleted, and writing the configuration modifications to the application configuration comprises deleting one or more of the plurality of registry keys from the application configuration corresponding to the one or more of the plurality of registry keys indicated by the information as having been deleted.

17. The method of claim 9, wherein the first and second virtualized application files are each configured to implement a virtual operating system having a virtual registry with a plurality of registry keys, in the sandbox memory location comprises a binary file having two hives, information indicating one or more of the plurality of registry keys of the virtual registry implemented by the first virtualized application file has been deleted is written to a first one of the hives, and information indicating one or more of the plurality of registry keys of the virtual registry implemented by the first virtualized application file has been modified is written to a second one of the hives.

18. The method of claim 17, wherein reading the configuration modifications from the sandbox memory location comprises:

traversing each of the hives of the binary file depth first.

19. The method of claim 9, wherein the first and second virtualized application files are configured to implement a virtual operating system having a virtual filesystem storing a plurality of files, the sandbox memory location comprises a first sub-directory and a second sub-directory, and the configuration modifications written to the sandbox memory location comprise:

information indicating one or more of the files in the virtual filesystem implemented by the first virtualized application file has been deleted in the first sub-directory; and information indicating one or more of the files in the virtual filesystem implemented by the first virtualized application file has been modified in the second sub-directory.

20. The method of claim 19, wherein reading the configuration modifications from the sandbox memory location comprises:

traversing each of the first and second sub-directories depth first.

21. A non-transitory computer-readable media comprising instructions that when executed by a processor implement a virtual application authoring tool, the instructions comprising:

an authoring tool module configured to create a virtual application configuration and a first read-only executable virtualized application file based on the virtual application configuration, when executed, the first executable virtualized application file implementing a virtual application configured to store information identifying a modification to its configuration made at runtime in a memory location; and a merge tool module configured to merge the information identifying the modification stored in the memory location into the virtual application configuration such that when the authoring tool module creates a new read-only executable virtualized application file based on the virtual application configuration, the new executable virtualized application file includes the modification made to the configuration of the virtual application implemented by the first read-only executable virtualized application file.

* * * * *